US010732686B2

(12) United States Patent
Guerrero et al.

(10) Patent No.: US 10,732,686 B2
(45) Date of Patent: Aug. 4, 2020

(54) SERIAL PORT PIN VOLTAGES

(71) Applicant: HEWLETT-PACKARD DEVELOPMENT COMPANY, L.P., Houston, TX (US)

(72) Inventors: Javier Enrique Guerrero, Houston, TX (US); Larry K Kunkel, Houston, TX (US); Binh T. Truong, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 167 days.

(21) Appl. No.: 15/752,084

(22) PCT Filed: Sep. 4, 2015

(86) PCT No.: PCT/US2015/048531
§ 371 (c)(1),
(2) Date: Feb. 12, 2018

(87) PCT Pub. No.: WO2017/039685
PCT Pub. Date: Mar. 9, 2017

(65) Prior Publication Data
US 2018/0239409 A1    Aug. 23, 2018

(51) Int. Cl.
*G06F 1/26* (2006.01)
*G06F 13/40* (2006.01)
(Continued)

(52) U.S. Cl.
CPC .............. *G06F 1/266* (2013.01); *G06F 13/38* (2013.01); *G06F 13/385* (2013.01); *G06F 13/4068* (2013.01); *G06F 1/3203* (2013.01)

(58) Field of Classification Search
CPC ......... G06F 1/266; G06F 13/38; G06F 13/385
(Continued)

(56) References Cited

U.S. PATENT DOCUMENTS 6,232,958 B1 * 5/2001 Casebolt ................. G06F 3/038
345/156
6,601,178 B1    7/2003 Gulick
(Continued)

FOREIGN PATENT DOCUMENTS

WO    WO 2012116247 A  * 7/2014
WO    WO-2014116247 A1   7/2014

OTHER PUBLICATIONS

Getting Started Guide: SurePOS 300-(4810-x4x/4910-x4x), Apr. 14, 2009.
(Continued)

*Primary Examiner* — Volvick Derose
(74) *Attorney, Agent, or Firm* — HP Inc. Patent Department

(57) ABSTRACT

Example implementations relate to serial port pin voltages. For example, an apparatus includes a first input device to receive a first input based on a setting, a second input device to receive a second input based on the setting, and a third input device to receive a third input based on the setting. The apparatus also includes a circuit coupled to the first input device, the second input device, and the third input device. In response to the first input, the second input, and the third input, the circuit is to provide a first voltage to a first pin of a serial port and a second voltage to a second pin of the serial port. The first voltage and the second voltage are defined by the setting.

12 Claims, 3 Drawing Sheets

(51) Int. Cl.
  *G06F 13/38* (2006.01)
  *G06F 1/3203* (2019.01)
(58) Field of Classification Search
  USPC .......................................................... 713/300
  See application file for complete search history.

(56) References Cited

U.S. PATENT DOCUMENTS

| | | |
|---|---|---|
| 6,651,177 B1 | 11/2003 | Rantze et al. |
| 2008/0282075 A1 | 11/2008 | Hsu et al. |
| 2011/0258357 A1 | 10/2011 | Lin |
| 2012/0159035 A1 | 6/2012 | Yin |
| 2012/0290853 A1 | 11/2012 | He et al. |

OTHER PUBLICATIONS

"HP 2-port Powered Serial Card", Jan. 30, 2008.
"V12SC-SER(-UPS) High Performance 8-port RS-232/422/485 PCIe/104 Serial port Module with Opto-isolation, software configuration . . . " Aug. 21, 2014.
HP KH887AA Serial PCI Card—Serial Adapter, 2 port powered. Powered Serial Cards.

* cited by examiner

SERIAL PORT PIN VOLTAGES

BACKGROUND

A serial port is a serial communication physical interface through which information is transferred in or out one bit at a time. For example, a computing device may transfer data to another computing device one bit at a time through the pins of a serial port.

BRIEF DESCRIPTION OF THE DRAWINGS

Some examples of the present application are described with respect to the following figures.

DETAILED DESCRIPTION

As described above, a serial port may be used to transfer data from one computing device to another computing device. A serial port may transfer data through the pins of the serial port. In some examples, at least one of the pins of a serial port may be connected to a power source in order to transfer data through the serial port. For example, in a 9-pin serial port, a certain amount of power may be provided to the data carrier detected (DCD) pin and/or the ring indicator (RI) pin of the serial port in order to properly operate the serial device through a computing device. The amount of power and/or the particular pin to be provided with power may depend upon the specifications of the serial device. However, if a computing device is configured to provide a certain amount of power to a certain serial port pin, these configurations may not be compatible with serial devices requiring different amounts of power to various serial port pins.

Examples discussed, herein provide techniques for independently controlling serial port pin voltages. The voltages to be applied to at least one serial port pin (e.g., the DCD pin, the RI pin, etc.) may be independently controlled through settings. For example, a user may specify settings that allow a certain voltage (e.g., 0 Volts, 5 Volts, 12 Volts, etc.) to be applied to a particular serial port pin and another voltage (e.g., the same voltage level or a different voltage level) to be applied to another serial port pin. In some examples, the settings may be specified through the Basic Input/Output System (BIOS) of a computing device. For example, a serial device that is connected to the computing device through a serial port may require that the DCD pin of the serial port be powered at 5 Volts and that the RI pin of the serial port be powered at 0 Volts in order to operate properly. A user may access the BIOS of the computing device to specify settings to drive 5 Volts to the DCD pin and 0 Volts to the RI pin. The techniques disclosed herein allow a computing device to independently control the power driven to various pins of a serial port based on settings specifying the desired power, providing the option and flexibility to operate a variety of serial port devices through the computing device.

Figure 1:
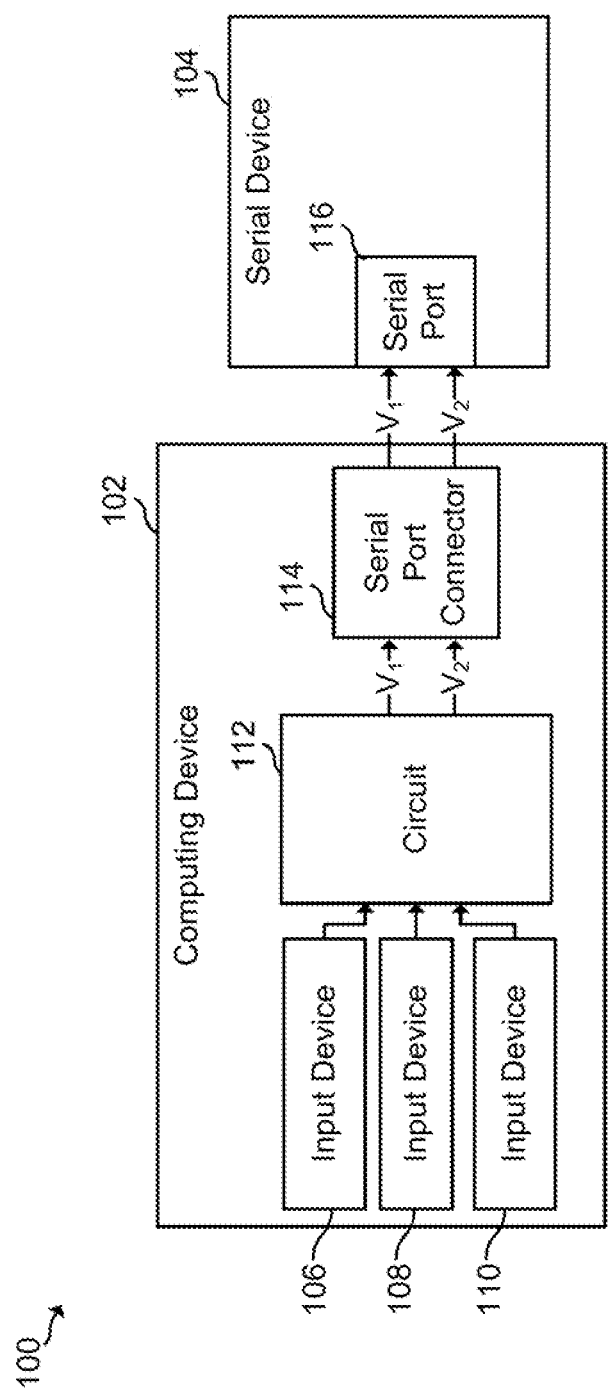
FIG. 1 is a block diagram of an example system for independently controlling serial port pin voltages.

Referring now to the figures, FIG. 1 is a block diagram of an example system 100 for independently controlling serial port pin voltages. The system 100 includes a serial device 104 that is serially connected to a computing device 102. The serial device 104 may be any suitable device capable of being coupled to another device via a serial connection. For example, the serial device 104 may be a device that is operable through computing device 102, such as a printer, a credit card device, or any other suitable peripheral device. The serial device 104 may be serially connected to the computing device 102 through a serial port 116 being coupled to a serial port connector 114 of the computing device 102. The serial port 116 of the serial device 104 may be any suitable serial port to transfer data serially, such as a 9-pin male serial port. The serial port connector 114 of the computing device 102 may be any suitable serial port connector to transfer data serially, such as a 9-pin female serial port connector. The serial port connector 114 may have a first output (e.g., the $V_1$ output) associated with a first pin (e.g., the DCD pin) of the serial) port 116 and a second output (e.g., the $V_2$ output) associated with a second pin (e.g., the RI pin) of the serial port 116.

The computing device 102 may be any suitable device capable of being coupled to another device via a serial connection. For example, the computing device 102 may be a web-based server, a local area network server, a cloud-based server, a notebook computer, a desktop computer, an all-in-one system, a tablet computing device, a mobile phone, an electronic book reader, a printing device, or any other electronic device suitable for independently controlling serial port pin voltages.

In some examples, computing device 102 may include a processor (not shown in FIG. 1) and a machine-readable storage medium (not shown in FIG. 1). The processor may be a tangible hardware component that may be a central processing unit (CPU), a semiconductor-based microprocessor, and/or other hardware devices suitable for retrieval and execution of instructions stored in the machine-readable storage medium. The processor may fetch, decode, and execute the instructions to control a process of independently controlling serial port pin voltages. As an alternative or in addition to retrieving and executing instructions, the processor may include at least one electronic circuit that includes electronic components for performing the functionality of the instructions stored in the machine-readable storage medium. The machine-readable storage medium may be any electronic, magnetic, optical, or other physical storage device that contains or stores executable instructions. Thus, the machine-readable storage medium may be, for example, Random Access Memory (RAM), an EPROM, an Electrically Erasable Programmable Read-Only Memory (EEPROM), a storage device, an optical disc, and the like. In some examples, the machine-readable storage medium may be a non-transitory storage medium, where the term "non-transitory" does not encompass transitory propagating signals. The machine-readable storage medium may be encoded with a series of processor-executable instructions for independently controlling serial port pin voltages based on settings (e.g., BIOS settings).

As shown in FIG. 1, the computing device 102 may include input device 106, input device 108, input device 110, circuit 112, and serial port connector 114. As described above, the serial port connector 114 may be any suitable serial port connector to connect the computing device 102 to the serial device 104 (e.g., to the serial port 116 of the serial device 104).

The input devices 106, 108, and 110 may be any suitable input device (e.g., a general-purpose input/output (GPIO) device) to each receive an input based on settings defining voltages to be provided to certain pins of the serial port 116 via the circuit 112 and the serial port connector 114. For example, a setting may specify that the DCD pin of the serial port 116 is to be provided with 12 Volts and, that the RI pin of the serial port 116 is to be provided with 12 Volts. Each input device 106, 108, and 110 may be provided with a particular input based on the setting, where the inputs may result in the providing of the specified voltages (e.g., the same voltage level or different voltages levels) to the DCD pin and the RI pin according to the setting.

The circuit 112 may be coupled to the input device 106, the input device 108, and the, input device 110 and may also be coupled to the serial port connector 114. The inputs received at input devices 106, 108, and 110 may be used as inputs to the circuit 112. The circuit 112, which will be described in more detail in FIG. 2, may be any suitable circuit to provide voltages to certain pins of the serial port 116 via the serial port connector 114 based on the settings and the inputs provided based on the settings. For example, in response to the inputs received at input devices 106, 108, and 110, the circuit 112 may output and provide a first voltage $V_1$ to the first output of the serial port connector 114 (e.g., the output associated with a first pin of the serial port 116) and may provide a second voltage $V_2$ to the second output of the serial port connector 114 (e.g., the output associated with a second pin of the serial port 116), where $V_1$ and $V_2$ are defined by the setting. The voltages provided to the outputs of the serial port connector 114 may be sent to the corresponding pins of the serial port 116 of the serial device 104.

Figure 2:
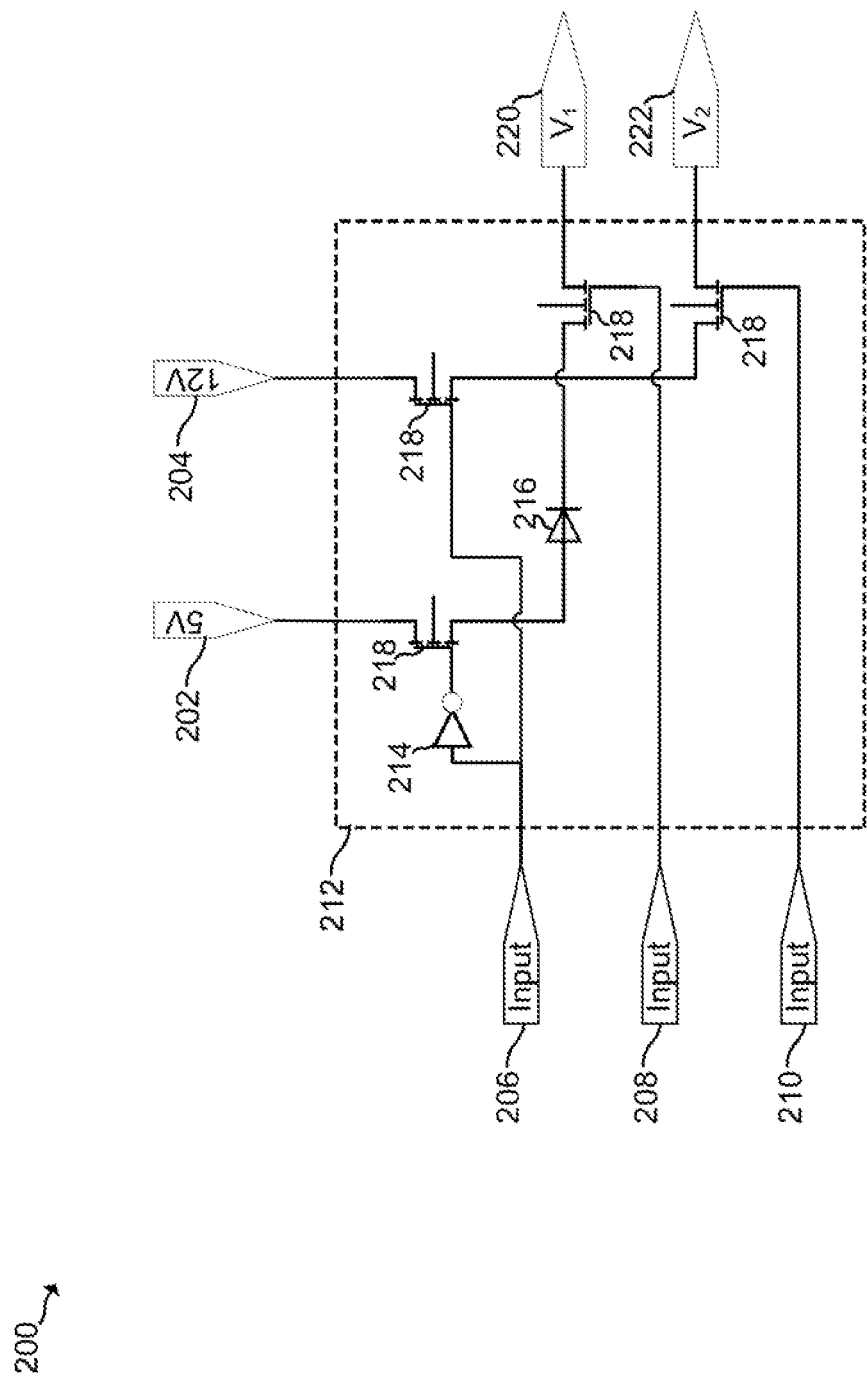
FIG. 2 is a block diagram of an example apparatus for independently controlling serial port pin voltages.

FIG. 2 is a block diagram of an example apparatus 200 for independently controlling serial port pin voltages. The apparatus 200 includes input device 206, input device 208, and input device 210. These input devices 206, 208, and 210 may be any suitable input device (e.g., a GPIO device) to each receive an input based on settings defining voltages to be provided to certain pins of a serial port, such as settings that define the $V_1$ output 220 and the $V_2$ output 222 to be provided to their respective serial port pins. The input devices 206, 208, and 210 may be similar to the input devices 106, 108, and 110, respectively, as described and shown in FIG. 1. For example, the input devices 206, 208, and 210 may each receive an input based on a setting (e.g., a BIOS setting) defining a first voltage (e.g., $V_1$) to be applied to a first pin of a serial port and a second voltage (e.g., $V_2$) to be applied to a second pin of the serial port.

The circuit 212 may be similar to the circuit 112 described and shown in FIG. 1 and may be coupled to input devices 206, 208, and 210. The circuit 212 may use the inputs from input devices 206, 208, and 210 as inputs to the circuit 212. In response to the inputs from input devices 206, 208, and 210, the circuit 212 may provide a first voltage (e.g., $V_1$) to a first pin (e,g, a DCD pin) of a serial port and may provide a second voltage (e.g., $V_2$) to a second pin (e.g., a RI pin) of the serial port according to the setting defining the voltages.

The circuit 212 may include a NOT gate 214, which may be any suitable NOT gate capable of producing an output that negates the input to the NOT gate (e.g., the input from input device 206). The circuit 212 may also include a diode 216, which may be any suitable diode, and transistors 218, which may be any suitable transistors. The circuit 212 may also be coupled to voltage sources 202 and 204, which may be any suitable type of voltage source producing any suitable amount of voltage. As shown in the example of FIG. 2, the circuit 212 may be coupled to a 5 Volt voltage source 202 and a 12 Volt voltage source 204.

The components of the circuit 212 may operate to produce a particular voltage $V_1$ output 220 and a voltage $V_2$ output 222 based on the inputs received at input devices 206, 208, and 210, where the inputs are received based on the setting specifying the desired voltages. Table 1 below shows examples of inputs provided to input devices 206, 208, and 210 and the voltages that result when the inputs are used as inputs to the circuit 212 (e.g., voltage $V_1$ output 220 and voltage $V_2$ output 222):

TABLE 1

Inputs and Corresponding Resultant Voltage Outputs

| Input Device 206 | Input Device 208 | Input Device 210 | $V_1$ 220 | $V_2$ 222 |
|---|---|---|---|---|
| 0 | 0 | 0 | 0 Volts | 0 Volts |
| 0 | 0 | 1 | 0 Volts | 5 Volts |
| 0 | 1 | 0 | 5 Volts | 0 Volts |
| 0 | 1 | 1 | 5 Volts | 5 Volts |
| 1 | 0 | 0 | 0 Volts | 0 Volts |
| 1 | 0 | 1 | 0 Volts | 12 Volts |
| 1 | 1 | 0 | 12 Volts | 0 Volts |
| 1 | 1 | 1 | 12 Volts | 12 Volts |

The inputs provided to the input devices 206, 208, and 210 may be provided based on the desired voltages defined by a setting (e.g., a BIOS setting). For example, the $V_1$ output 220 may be an output to be sent to the DCD pin of a serial port, and the $V_2$ output 222 may be an output to be sent to the RI pin of a serial port. A particular serial device may require that the DCD pin of its serial port be powered at 12 Volts and that the RI pin of its serial port be powered at 0 Volts, and BIOS settings may be set (e.g., by a user) to reflect these desired voltages. As shown in Table 1 above, based on these settings, the computing device may provide an input of 1 (e.g., enabled) to input device 206, and input of 1 (e.g., enabled) to input device 208, and an input of 0 (e.g., disabled) to input device 210. These inputs may result in the $V_1$ output 220 being 12 Volts and the $V_2$ output 222 being 0 Volts, where these voltages may be provided to the corresponding DCD pin and RI pin, respectively.

In some examples, the inputs to input devices 206, 208, and 210 may be a particular set of input values associated with operating a particular serial device and may be another set of input values associated with operating another serial device having different operating specifications. For example, a particular serial device may require that the DCD pin and the RI pin both be powered at 0 Volts, and, based on settings, a particular set of input values may be provided to the input devices 206, 208, and 210 accordingly (e.g., the input values of 0, 0, and 0, respectively, based on Table 1). Similarly, another serial device may require that the DCD pin be powered at 0 Volts and that the RI pin be powered at 5 Volts. The settings may be adjusted to reflect this change in the desired pin voltages, and another set of input values may be provided to the input devices 206, 208, and 210 accordingly (e.g., the input values of 0, 0, and 1, respectively, based on Table 1).

Figure 3:
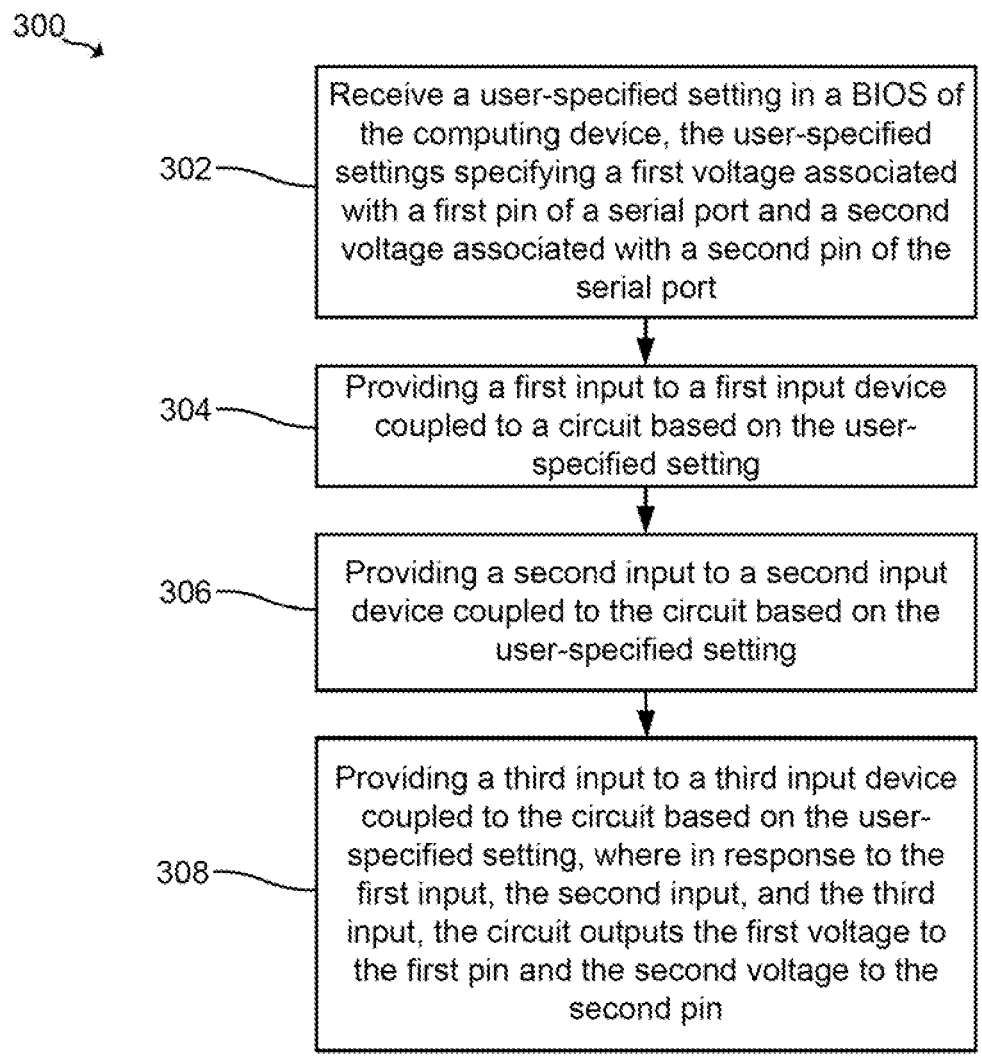
FIG. 3 is a flowchart of an example method for independently controlling serial port pin voltages.

FIG. 3 is a flowchart of an example method 300 for independently controlling serial port pin voltages. Method 300 may be implemented using computing device 102 of FIG. 1.

Method 300 includes, at 302, receiving a user-specified setting in a BIOS of the computing device. The user-specified setting specifies a first voltage associated with a first pin of a serial port and a second voltage associated with a second pin of the serial port. These settings may be specified by a user and adjusted if a serial device with different specifications is to be used. For example, referring to FIG. 1, the computing device 102 may receive a user-specified setting in a BIOS of the computing device 102 The setting may specify a particular voltage (e.g., $V_1$) associated with a particular pin (e.g., the DCD pin) of the serial port 116 and may specify another voltage (e.g., $V_2$) associated with another pin (e.g., the RI pin) of the serial port 116.

Method 355 also includes, at 304, providing a first input to a first input device coupled to a circuit based on the user-specified setting. For example, referring to FIG. 1, the computing device 102 may provide an input to the input device 106 coupled to the circuit 112, where the input is a particular input based on the desired voltages specified by the user-specified setting.

Method 300 also includes, at 306, providing a second input to a second input device coupled to the circuit based on the user-specified setting. For example, referring to FIG. 1, the computing device 102 may provide an input to the input device 108 coupled to the circuit 112, where the input is a particular input based on the desired voltages specified by the user-specified setting.

Method 300 also includes, at 308, providing a third input to a third input device coupled to the circuit based on the user-specified setting. In response to the first input, the second input, and the third input, the circuit may output the first voltage to the first pin and the second voltage to the second pin. For example, referring to FIG. 1, the computing device 102 may provide an input to the input device 110 coupled to the circuit 112, where the input is a particular input based on the desired voltages specified by the user-specified setting. In response to the inputs provided to the input devices 106, 108, and 110, the circuit 112 may output a first voltage (e.g., $V_1$) to a particular pin (e.g., the DCD pin) of the serial port 116 and a second voltage (e.g., $V_2$) to another pin (e.g., the RI pin) of the serial port 118.

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/dr machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing, system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. An apparatus, comprising:
   a first general-purpose input/output (GPIO) device to receive a first input based on a setting;
   a second GPIO device to receive a second input based on the setting;
   a third GPIO device to receive a third input based on the setting; and
   a circuit coupled to the first GPIO device, the second GPIO device, and the third GPIO device,
   wherein in response to the first input, the second input, and the third input, the circuit is to provide a first voltage to a first pin of a serial port and a second voltage to a second pin of the serial port,
   wherein the first voltage and the second voltage are defined by the setting and
   wherein the setting corresponds to a ternary logic table; and
   wherein the first pin is a data carrier detected (DCD) pin of the serial port and wherein the second pin is a ring indicator (RI) pin of the serial port.

2. The apparatus of claim 1, wherein the setting is a Basic Input/output System (BIOS) setting.

3. The apparatus of claim 1, wherein the first voltage and the second voltage are different voltage levels simultaneously based on the setting.

4. The apparatus of claim 1, wherein the first voltage is 0 Volts, 5 Volts, or 12 Volts, and wherein the second voltage is 0 Volts, 5 Volts, or 12 Volts.

5. The apparatus of claim 1, wherein the first input, the second input, and the third input are a first set of input values associated with operating a first device using the serial port and wherein the first input, the second input, and the third input are a second set of input values associated with operating a second device using the serial port.

6. A method, comprising:
   receiving, by a computing device, a user-specified setting in a Basic Input/Output System (BIOS) of the computing device, the user-specified setting specifying a first voltage associated with a first pin of a serial port and a second voltage associated with a second pin of the serial port;
   providing, by the computing device, a first input to a first general-purpose input/output (GPIO) device coupled to a circuit based on the user-specified setting;
   providing, by the computing device, a second input to a second GPIO device coupled to the circuit based on the user-specified setting; and
   providing, by the computing device, a third input to a third GPIO device coupled to the circuit based on the user-specified setting,
      wherein in response to the first input, the second input, and the third input, the circuit outputs the first voltage to the first pin and the second voltage to the second pin and wherein the setting corresponds to a ternary logic table.

7. The method of claim 6, wherein the first pin is a data carrier detected (D D) pin of the serial port and wherein the second pin is a ring indicator (RI) pin of the serial port.

8. The method of claim 6, wherein the first voltage and the second voltage are different voltage levels simultaneously based on the setting.

9. The method of claim 6, wherein, the first voltage is 0 Volts, 5 Volts, or 12 Volts, and wherein the second voltage is 0 Volts, 5 Volts, or 12 Volts.

10. A computing device, comprising:
    a first general-purpose input/output (GPIO) device to receive a first input based on a setting;
    a second GPIO device to receive a second input based on the setting;
    a third GPIO device to receive a third input based on the setting; and
    a circuit coupled to the first GPIO device, the second GPIO device, and the third GPIO device; and
    a serial port connector coupled to the circuit, the serial port connector having a first output associated with a first pin of a serial port and a second output associated with a second pin of the serial port, wherein in response to the first input, the second input, and the third input, the circuit is to provide a first voltage to the first output and a second voltage to the second output, wherein the setting corresponds to a ternary logic table and wherein the first voltage and the second voltage are defined by the setting; and wherein the first pin is a data carrier detected (DCD) pin of the serial port and wherein the second pin is a ring indicator (RI) pin of the serial port.

11. The computing device of claim 10, wherein the setting is a Basic Input/Output System (BIOS) setting.

12. The computing device of claim 10, wherein the first voltage and the second voltage are different voltage levels simultaneously based on the setting.

* * * * *